United States Patent [19]

Miller

[11] 4,169,120

[45] Sep. 25, 1979

[54] SULFUR ELECTRODE FOR SODIUM-SULFUR BATTERIES

[75] Inventor: Frederick C. Miller, Johnson City, Tenn.

[73] Assignee: Great Lakes Carbon Corporation, New York, N.Y.

[21] Appl. No.: 906,268

[22] Filed: May 15, 1978

Related U.S. Application Data

[62] Division of Ser. No. 750,974, Dec. 15, 1976, abandoned.

[51] Int. Cl.$^2$ .............................................. H01M 4/04
[52] U.S. Cl. ................................. 264/29.5; 252/502; 264/105; 423/448; 423/449; 423/460; 429/104
[58] Field of Search ................... 264/29.1, 29.5, 29.7, 264/105; 429/101–104, 217, 218, 232, 235, 245; 252/502; 423/448, 449, 460

[56] References Cited

U.S. PATENT DOCUMENTS

| | | | |
|---|---|---|---|
| 3,573,086 | 3/1971 | Lambdin, Jr. ........................ | 264/29.5 |
| 3,716,409 | 2/1973 | Cairns et al. ......................... | 429/103 |
| 3,748,178 | 7/1973 | Fally et al. .......................... | 429/104 |
| 3,829,327 | 8/1974 | Omori et al. ........................ | 429/218 |
| 3,856,574 | 12/1974 | Amagi et al. ....................... | 429/218 |
| 3,883,367 | 5/1975 | Chiku et al. ........................ | 429/218 |
| 3,946,751 | 3/1976 | Breiter et al. ....................... | 429/218 |

*Primary Examiner*—Jeffery R. Thurlow
*Attorney, Agent, or Firm*—R. Laddie Taylor

[57] ABSTRACT

A sulfur electrode for a sodium-sulfur secondary battery comprises a carbonized chopped graphite fiber-resin composite structure impregnated with sulfur.

4 Claims, No Drawings

SULFUR ELECTRODE FOR SODIUM-SULFUR BATTERIES

This is a division of Ser. No. 750,974, filed Dec. 15, 1976, now abandoned.

BACKGROUND OF THE INVENTION

1. Field of the Invention

This invention relates to sodium-sulfur storage batteries and particularly to a novel sulfur electrode for such a battery.

2. Description of Prior Art

The conventional sodium-sulfur secondary battery comprises a casing containing sodium and sulfur reactants, the reactants being molten at the operating temperature of the battery, separated by a solid electrolyte, such as beta-alumina ceramic. During discharge, the sodium is ionized and these ions pass through the solid electrolyte and react with sulfur in the sulfur electrode which conventionally comprises sulfur that is molten at the battery operating temperature and a current collector, to form sodium polysulfide ($Na_2S_x$). The energy generated by this reaction is electrically removed from the battery through terminals provided therein. The battery may be recharged by supplying current thereto from an external source in the reverse direction, causing the sodium polysulfide produced during discharge to decompose and pass as sodium ions through the solid electrolyte to the molten sodium region of the cell where metallic sodium is formed by electron addition.

It is important in a battery of this type that the current collector portion of the sulfur electrode has a high current collecting ability, and it is required that the structure has high strength and excellent corrosion resistance. Additionally, good sodium-sulfur battery performance depends to a large extent on the distribution of sulfur in the current collector.

It is well known in the prior art to utilize carbon or graphite felt or yarn in various forms as the current collector portion of the sulfur electrode for a sodium-sulfur battery. U.S. Pat. No. 3,883,367—Chiku et al., for example, discloses a sodium-sulfur battery having a porous current collector formed of a knitted or woven carbon yarn as part of its sulfur electrode. Sulfur is absorbed on the felt or yarn and wicking is the dominant mode for mass transport of reactants in the sulfur electrode during operation thereof. Acceptable performance in this type of battery requires a continuous generally uniform distribution of high porosity carbon or graphite throughout the sulfur electrode, and the amount of absorbance of the reactants by the felt or yarn essentially depends on the available surface area per unit volume of absorbent.

While known current collectors for sulfur electrodes in sodium-sulfur batteries partially fulfill the requirements presented above, several problems remain unsolved. It is obvious that ideal sulfur distribution cannot be obtained in current collectors known in the art, in view of the methods of adding the molten sulfur to the collector. Further, the carbon or graphite felt or yarn conventionally utilized in the current collector cannot be uniformly distributed in the battery due to the flexibility of this material. The material must be pressed against the solid electrolyte by a backing plate to assure adequate electrical contact thereto. This pressure restricts the flow of $Na_2S_x$ through the current collector. Additionally, due to the physical characteristics of the material, it is not possible to machine the current collector to required specifications. When a knitted or woven carbon or graphite fiber shape is used, a further problem is that the separate fibers are not bonded to each other, resulting in increased resistivity of the sulfur electrode.

SUMMARY OF THE INVENTION

This invention provides an improved sulfur electrode for a sodium-sulfur secondary battery comprising a formed carbonized chopped graphite fiber-resin composite structure substantially completely impregnated with sulfur. The electrode is manufactured by: mixing chopped graphite fibers, preferably having a length of about 1/32 to about 3/4 inch, with about 5 to about 30 wt.% of a high carbon yield resin, based on the weight of the total mixture; compressing the mixture to a density of about 0.05 to about 0.10 g/cc at elevated temperature to form a porous compact; curing the resin in the compact; carbonizing the compact; substantially completely impregnating the carbonized compact with molten sulfur; and cooling the impregnated carbonized compact to a temperature below the melting point of the sulfur impregnant.

The sulfur electrode of the invention fulfills the requirement that the sulfur be evenly distributed in the current collector, since the collector is substantially completely impregnated with sulfur before it is inserted in the battery. It can be readily appreciated by one skilled in the art that the sulfur electrode has advantages over known electrodes of this type in that the individual fibers are bonded to each other by the carbon provided when the resin is carbonized, thus ensuring permanent conductive electrical contact between the fibers to provide low resistance together with a high surface area/volume ratio for better carbon-catholyte contact. Further, the formed structure can be machined to the exact specifications required and is easily handled during processing. Additionally, the electrode structure is substantially less expensive to fabricate than known sulfur electrodes, especially those requiring intricate knitting or weaving.

DESCRIPTION OF THE PREFERRED EMBODIMENT

The invention will now be described in the following nonlimiting example.

Graphite fibers derived from polyacrylonitrile, regenerated cellulose, or other precursor fibers by methods well known in the art are chopped to a length of about one eighth inch and blended with about 20 wt.% of phenolic resin at room temperature, based on the weight of the total mixture, to form a chopped graphite fiber-resin mixture. This mixture is placed in a mold and compressed to a density of 0.08 g/cc at a temperature of 110° C. to form a porous compact. The compact is held at a temperature of about 110° C. for a 12 hour period to cure the resin. The cured body is carbonized at a temperature of about 1500° C. in vacuum or an inert atmosphere. The carbonized composite structure is then fully impregnated with molten sulfur at 120° C. using a vacuum/pressure cycle at 100 p.s.i.g. and then cooled to a temperature below the melting point of the sulfur impregnant. The formed sulfur electrode is then machined to required tolerances for incorporation into a sodium-sulfur battery.

While the invention has been described in detail and with reference to a specific embodiment thereof, it will be apparent to one skilled in the art that various changes and modifications can be made therein without departing from the scope and spirit thereof, and, therefore, the invention is not intended to be limited except as indicated in the appended claims.

What is claimed is:

1. A process for producing a formed carbonized chopped graphite fiber-resin composite sulfur electrode for use in a sodium-sulfur secondary battery comprising, in the order recited, the steps of: (a) mixing chopped graphite fibers with about 5 to about 30 wt.% of a high carbon yield resin, based on the weight of the total mixture; (b) compressing the chopped graphite fiber-resin mixture to a density of about 0.05 to about 0.10 g/cc at elevated temperature to form a porous compact; (c) curing the resin in the compact; (d) carbonizing the cured compact; (e) substantially completely impregnating the compact with molten sulfur; and (f) cooling the impregnated compact to a temperature below the melting point of the sulfur impregnant.

2. The process of claim 1, wherein the chopped graphite fibers are bonded with about 20 wt.% resin, based on the weight of the uncured fiber-resin structure.

3. The process of claims 1 or 2, wherein the resin is phenolic resin.

4. A process for producing a formed carbonized chopped graphite fiber-resin composite sulfur electrode for use in a sodium-sulfur secondary battery comprising, in the order recited, the steps of: (a) mixing chopped graphite fibers with about 20 wt.% of phenolic resin, based on the weight of the total mixture; (b) compressing the chopped graphite fiber-resin mixture to a density of about 0.08 g/cc at a temperature of about 110° C. to form a porous compact; (c) curing the resin in the compact at a temperature of about 110° C.; (d) carbonizing the cured compact; (e) substantially completely impregnating the compact with molten sulfur; and (f) cooling the impregnated compact to a temperature below the melting point of the sulfur impregnant.

* * * * *